(12) United States Patent
Saito et al.

(10) Patent No.: US 12,433,449 B2
(45) Date of Patent: *Oct. 7, 2025

(54) COFFEE BEAN GRINDING MACHINE

(71) Applicant: DAITO GIKEN, INC., Tokyo (JP)

(72) Inventors: Masato Saito, Tokyo (JP); Taisuke Torizu, Tokyo (JP)

(73) Assignee: DAITO GIKEN, INC., Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 18/038,724

(22) PCT Filed: Nov. 8, 2021

(86) PCT No.: PCT/JP2021/040974
§ 371 (c)(1),
(2) Date: May 25, 2023

(87) PCT Pub. No.: WO2022/118609
PCT Pub. Date: Jun. 9, 2022

(65) Prior Publication Data
US 2024/0032732 A1 Feb. 1, 2024

(30) Foreign Application Priority Data
Dec. 3, 2020 (JP) .................. 2020-201272

(51) Int. Cl.
*A47J 42/38* (2006.01)
*A47J 31/42* (2006.01)
(Continued)

(52) U.S. Cl.
CPC .............. *A47J 42/38* (2013.01); *A47J 42/22* (2013.01)

(58) Field of Classification Search
CPC .. A47J 42/44; A47J 42/16; A47J 31/42; A47J 31/51; G07F 9/001; G07F 9/002; G07F 9/006; G07F 13/065
See application file for complete search history.

(56) References Cited

U.S. PATENT DOCUMENTS

2014/0263780 A1 9/2014 Day, Jr.
2014/0282198 A1 9/2014 Mayworm
(Continued)

FOREIGN PATENT DOCUMENTS

EP     3 087 844 A2     11/2016
JP     H04312419 A  *  11/1992
(Continued)

OTHER PUBLICATIONS

English translate (JPH04312419A), retrieved date Apr. 16, 2025.*
(Continued)

*Primary Examiner* — Mohammed S. Alawadi
(74) *Attorney, Agent, or Firm* — Oliff PLC

(57) ABSTRACT

A coffee bean grinding machine with which a taste of coffee can be enjoyed. A coffee bean grinding machine including: a grinder configured to grind coffee beans; and a control device configured to control the grinder, in which the grinder has a plurality of types of particle sizes that can be set for producing ground coffee beans, and the control device controls the production of the ground coffee beans while changing the set particle size of the grinder according to the plurality of set particle sizes.

3 Claims, 15 Drawing Sheets

(51) Int. Cl.
*A47J 42/22* (2006.01)
*A47J 42/26* (2006.01)
*G07F 9/00* (2006.01)
*G07F 13/04* (2006.01)
*G07F 13/06* (2006.01)

(56) References Cited

U.S. PATENT DOCUMENTS

2014/0314921 A1  10/2014  Kuempel et al.
2016/0055599 A1  2/2016   Illy et al.
2022/0117442 A1* 4/2022   Dionisio ............... A47J 31/42

FOREIGN PATENT DOCUMENTS

JP  2004-105627 A  4/2004
JP  2019-30433 A   2/2019
WO  WO-2016132412 A1 * 8/2016 ............. A47J 31/00
WO  2020161630 A1  8/2020
WO  2021148258 A1  7/2021

OTHER PUBLICATIONS

English translate (WO2016132412A1), retrieved date Apr. 16, 2025.*
Dec. 28, 2021 International Search Report issued in International Patent Application No. PCT/JP2021/040974.
May 9, 2024 Office Action Issued in Taiwanese Patent Application No. 110143470.
Jan. 5, 2024 Search Report issued in European Patent Application No. 21900364.7.
English Translation of May 30, 2023 International Preliminary Report on Patentability issued in International Application No. PCT/JP2021/040974.
Apr. 23, 2025 Office Action issued in Korean Patent Application No. 10-2023-7019879.

* cited by examiner

[Figure 1]
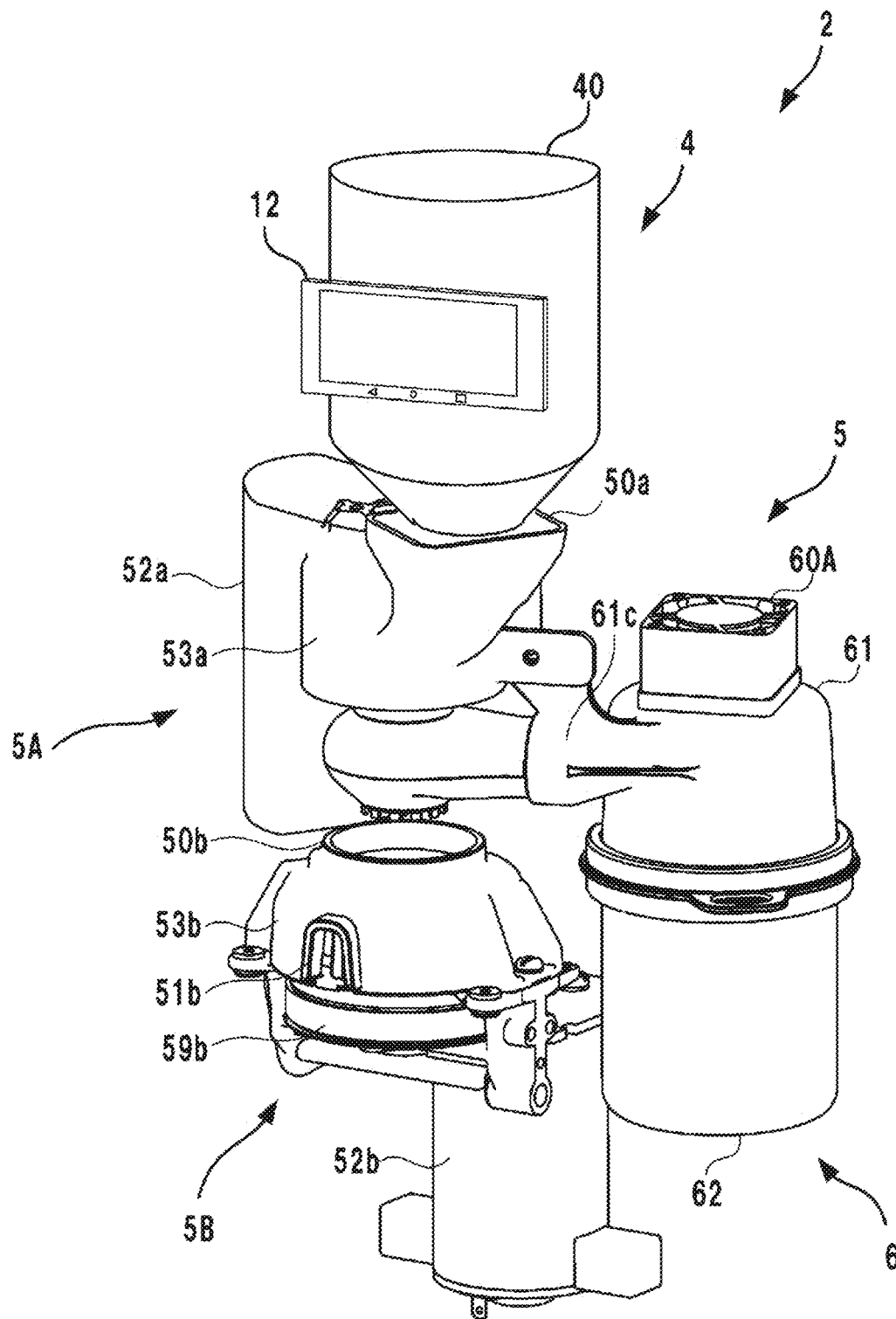

[Figure 2]
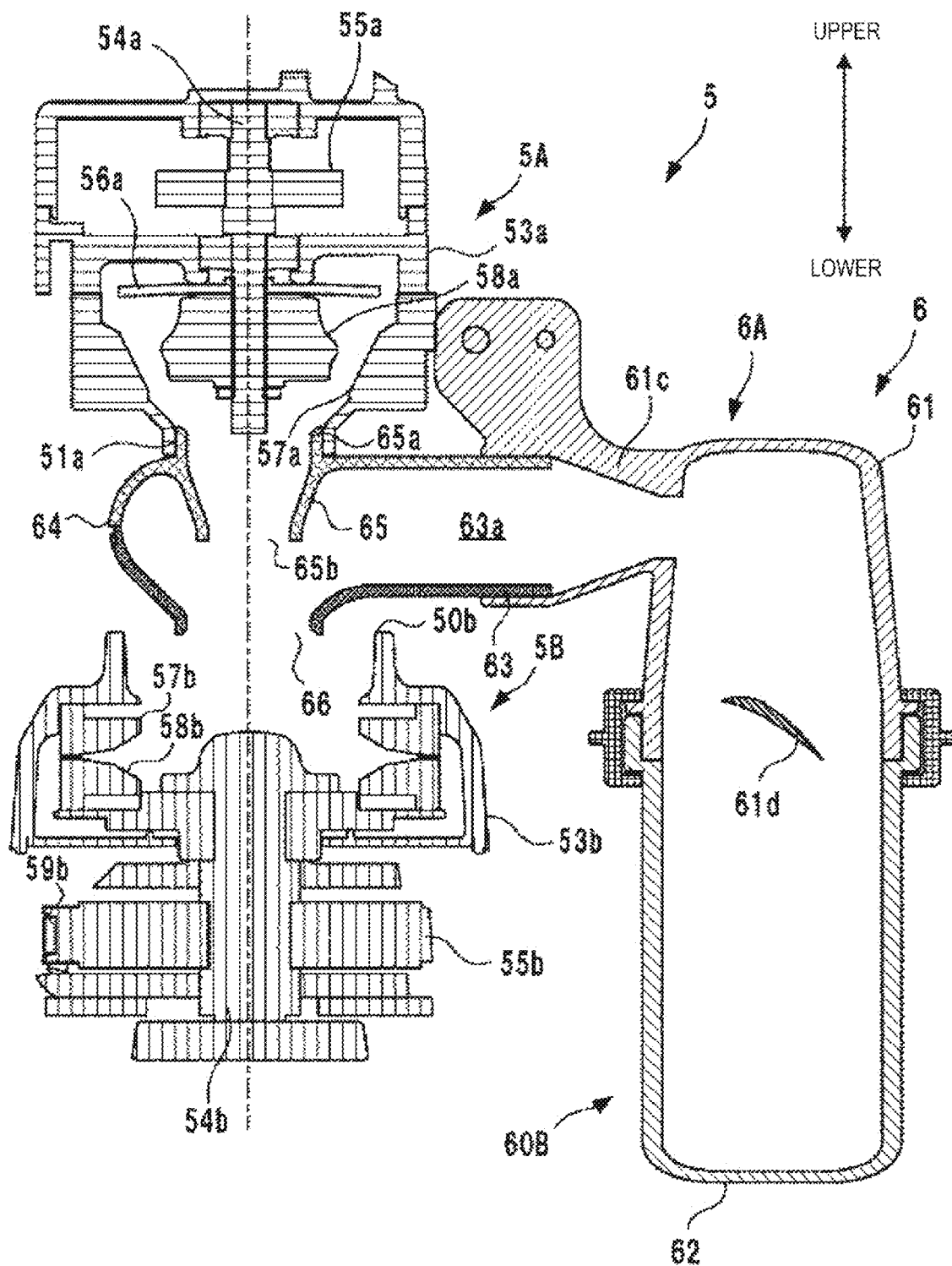

[Figure 3]
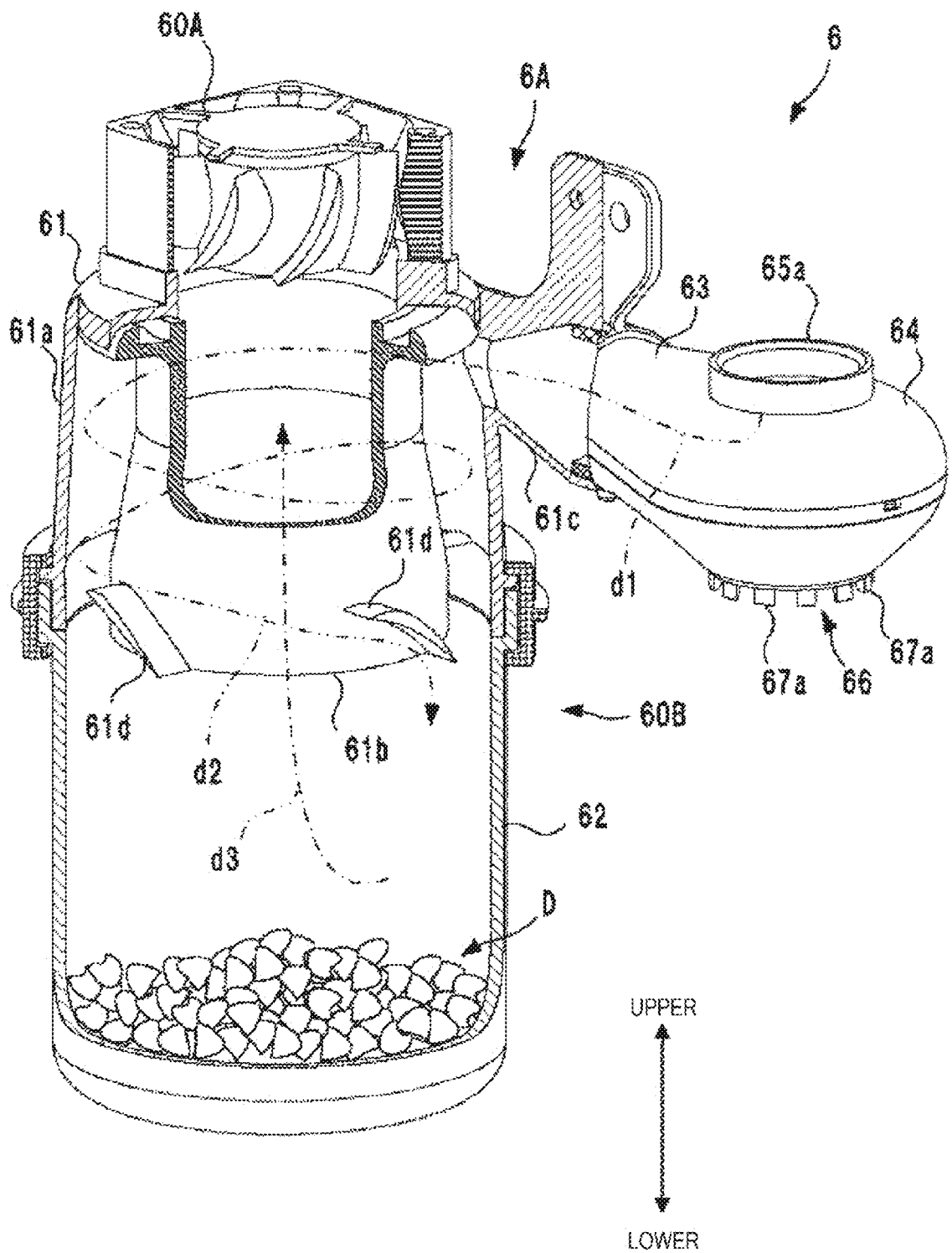

[Figure 4]
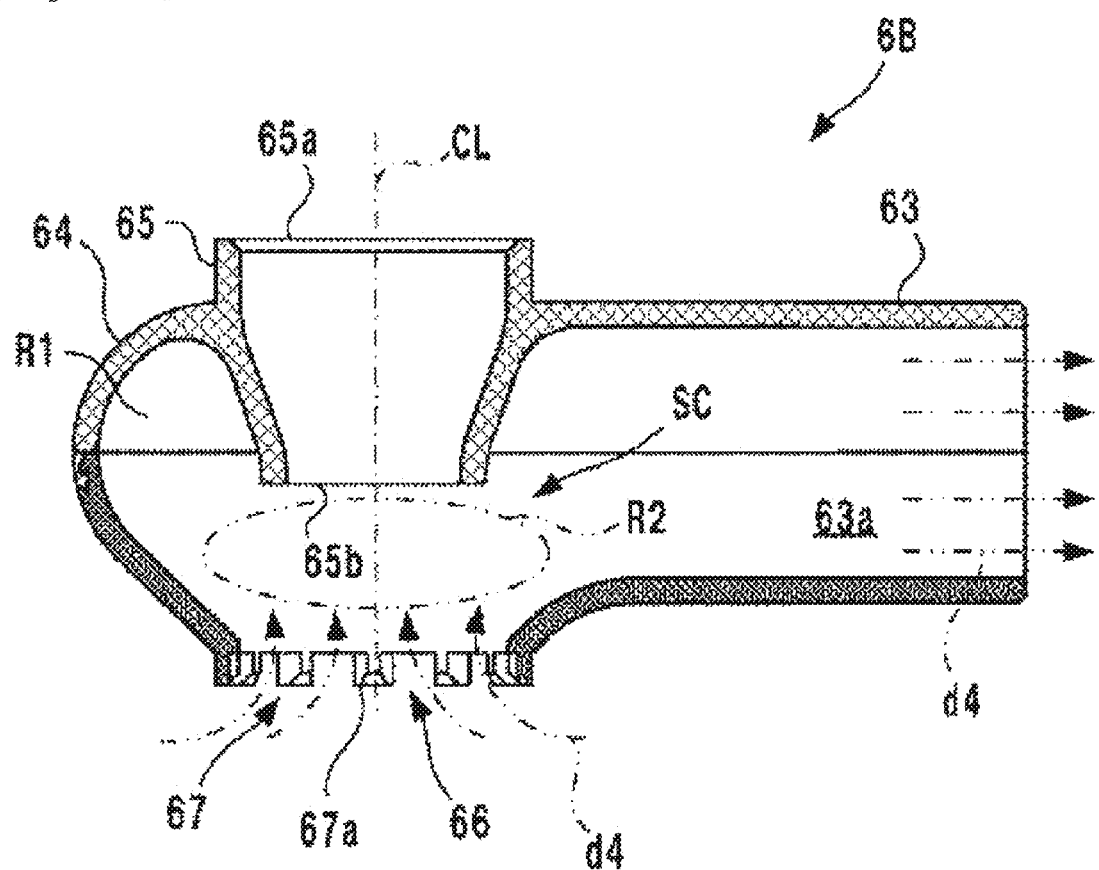

[Figure 5]
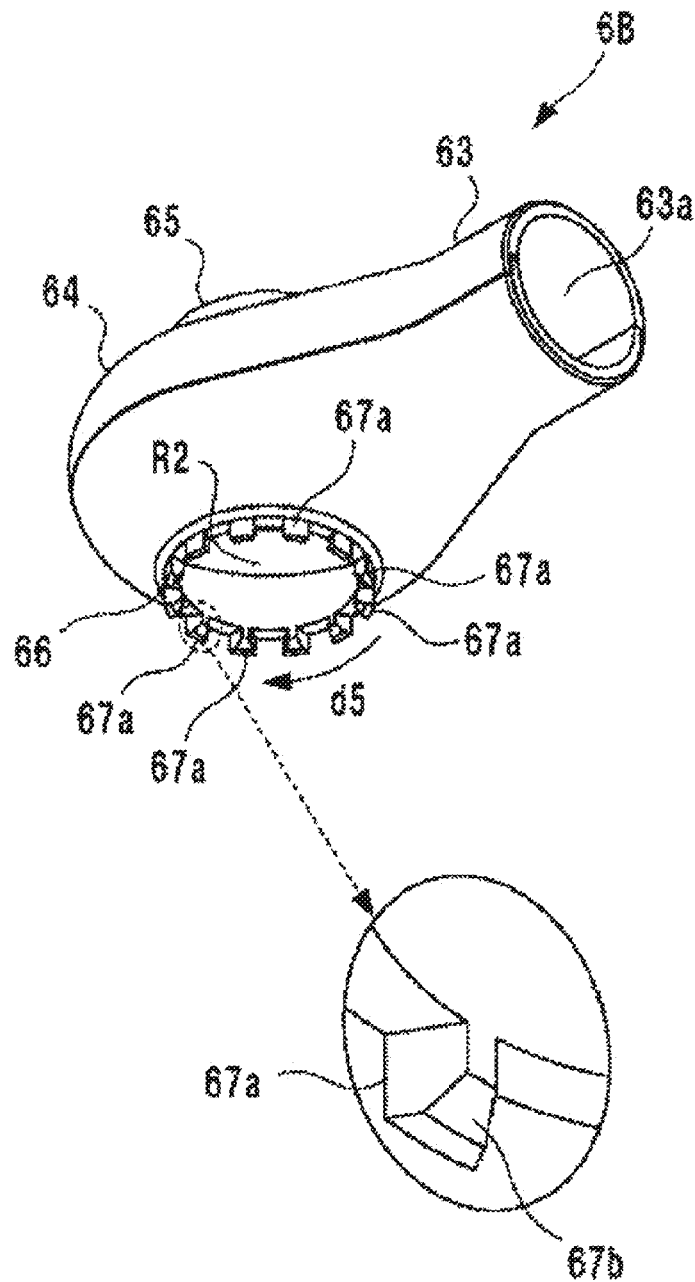

[Figure 6]
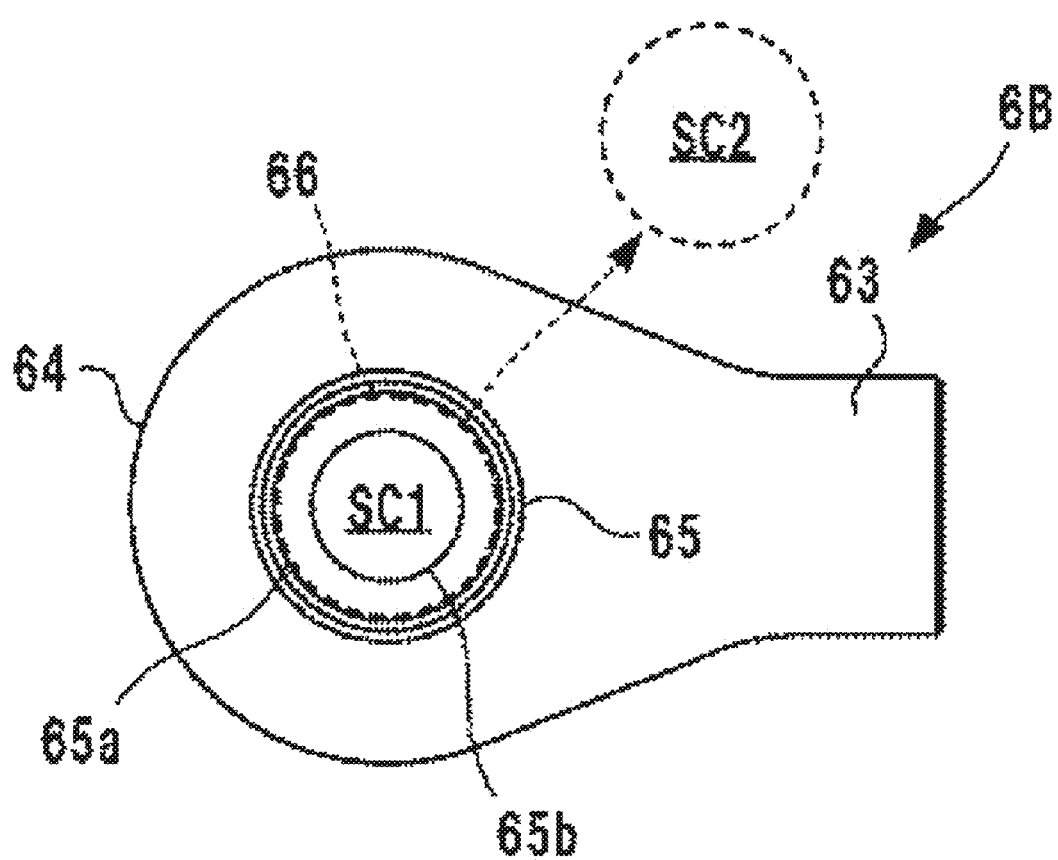

[Figure 7]
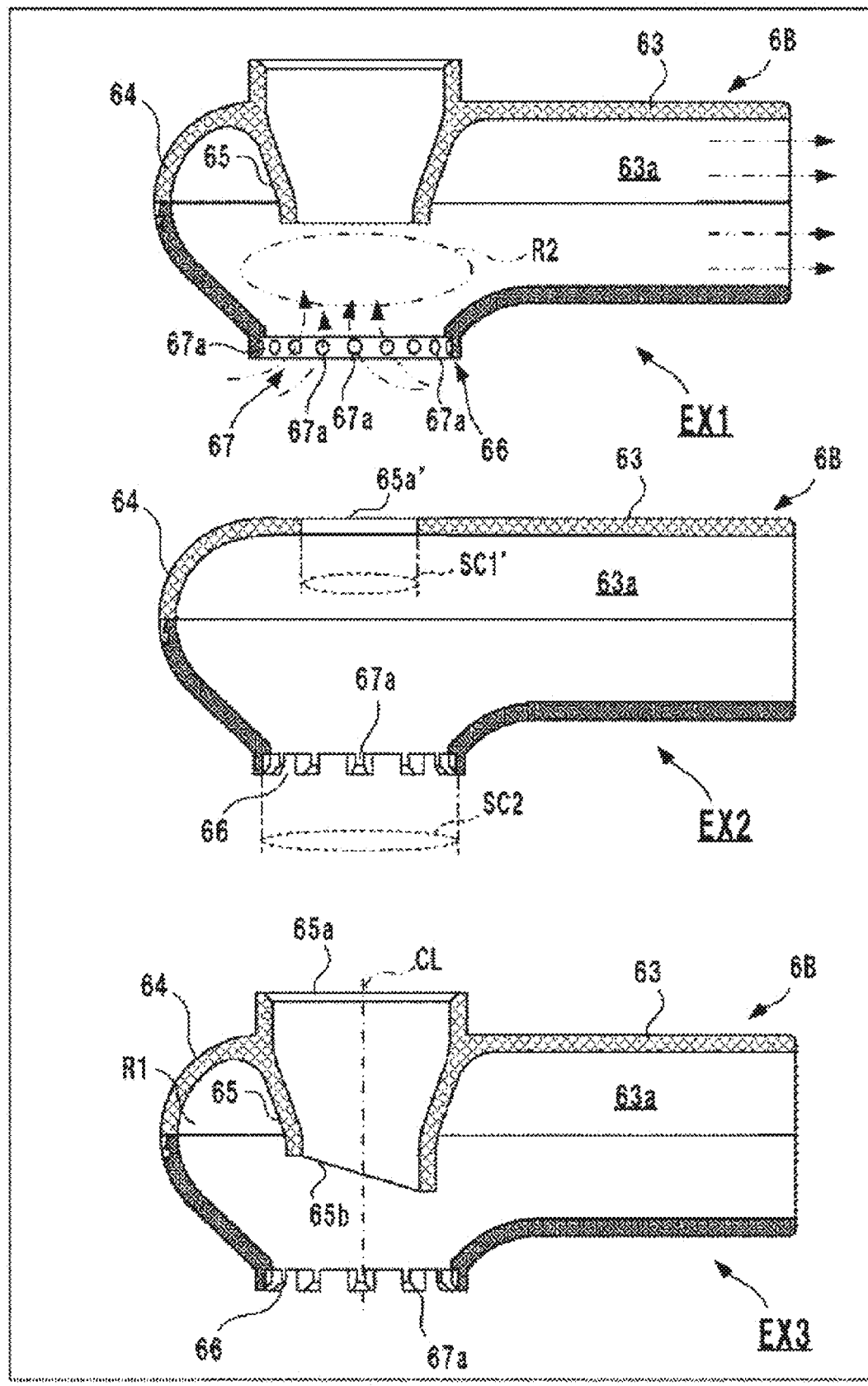

[Figure 8]
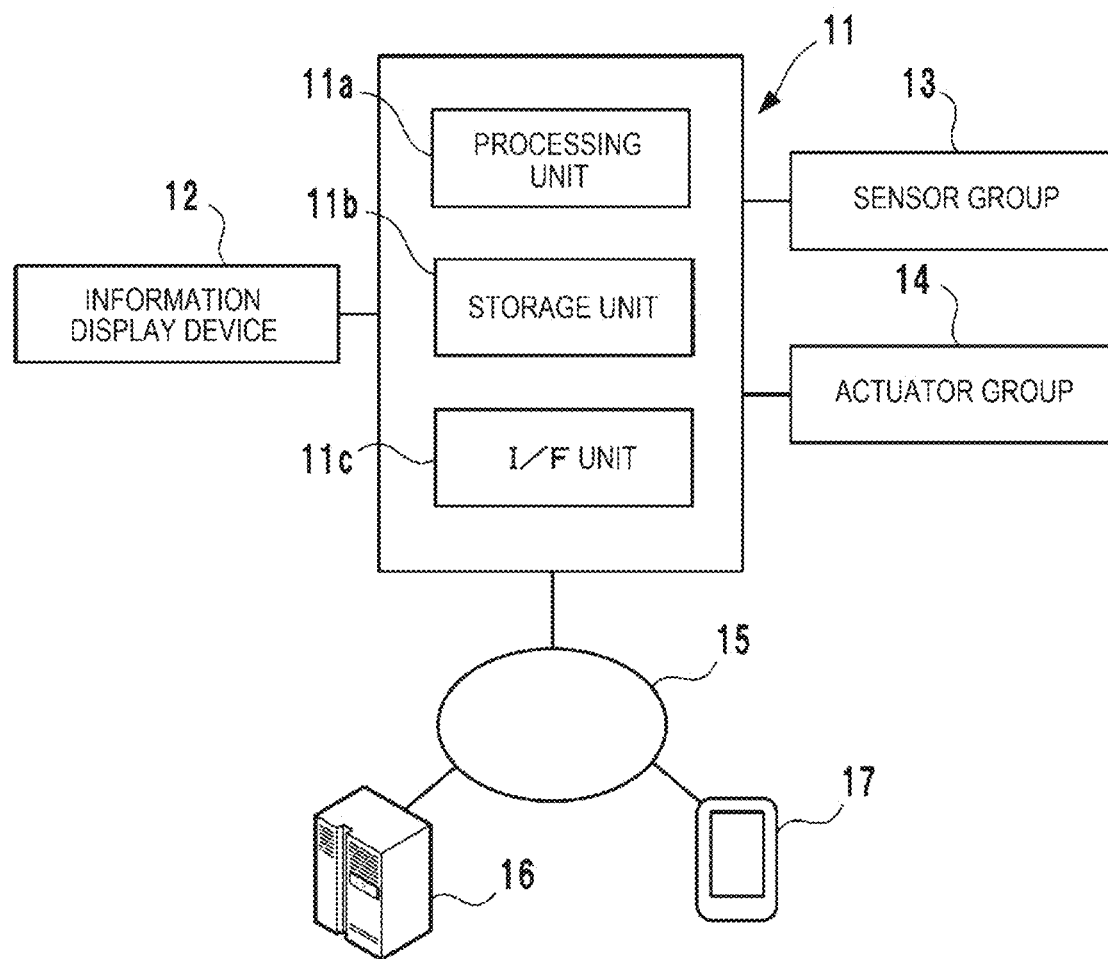

[Figure 9]
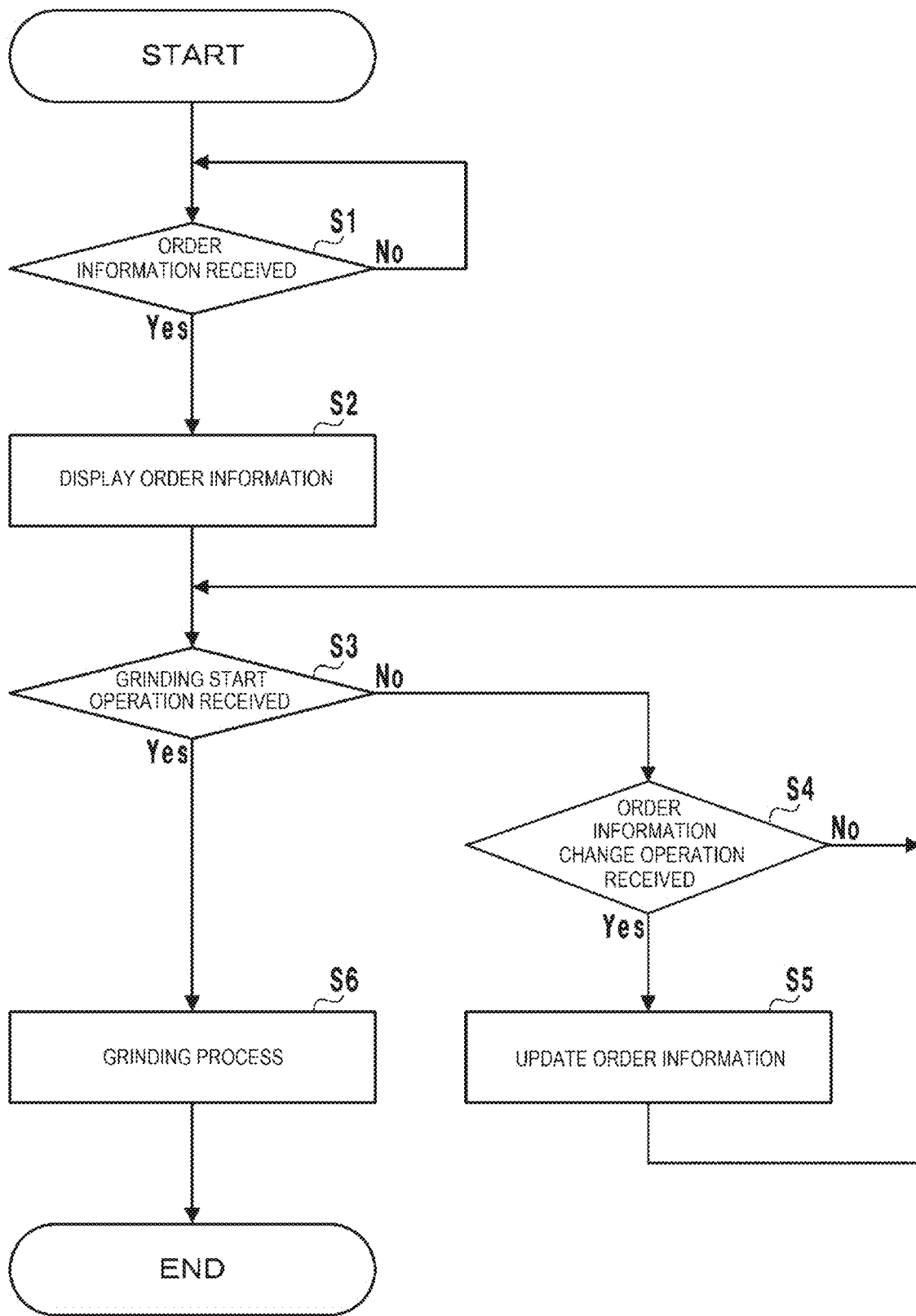

[Figure 10]
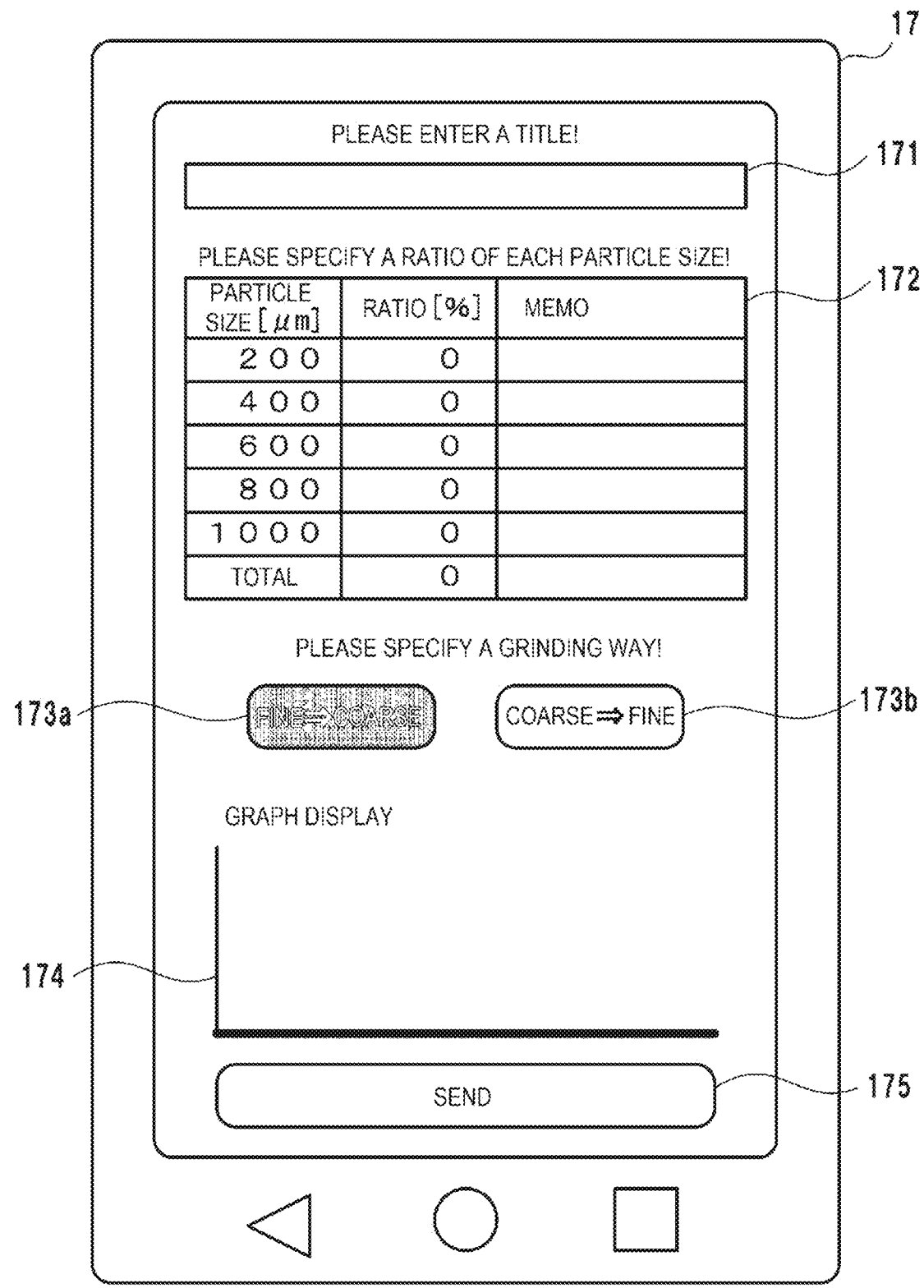

[Figure 11]

| PARTICLE SIZE [μm] | RATIO [%] | MEMO |
|---|---|---|
| 200 | 40 | THE TASTE IS WEAK AT 400 μ! |
| 400 | 0 | |
| 600 | 0 | |
| 800 | 60 | MINIMAL UNPLEASANT TASTE IN TASTING! |
| 1000 | 0 | |
| TOTAL | 100 | THE OPINION OF Mr./Ms. B IS CONSIDERED. |

PLEASE ENTER A TITLE!

GEISHA FOR FRENCH PRESS

PLEASE SPECIFY A RATIO OF EACH PARTICLE SIZE!

PLEASE SPECIFY A GRINDING WAY!

FINE ⇒ COARSE

COARSE ⇒ FINE

GRAPH DISPLAY

SEND

[Figure 12]

PLEASE ENTER A TITLE!

GEISHA FOR FRENCH PRESS

PLEASE SPECIFY A RATIO OF EACH PARTICLE SIZE!

| PARTICLE SIZE [μm] | RATIO [%] | MEMO |
|---|---|---|
| 200 | 40 | THE TASTE IS WEAK AT 400 μl |
| 400 | 0 | |
| 600 | 60 | |
| 800 | 0 | MINIMAL UNPLEASANT TASTE IN TASTING! |
| 1000 | 0 | |
| TOTAL | 100 | THE OPINION OF Mr./Ms. B IS CONSIDERED. |

PLEASE SPECIFY A GRINDING WAY!

FINE ⇒ COARSE    COARSE ⇒ FINE

GRAPH DISPLAY

SEND

GRIND INFORMATION RECEIVED!
GEISHA FOR FRENCH PRESS                                    THE AMOUNT OF BEANS[g]

| PARTICLE SIZE [μm] | RATIO [%] | MEMO |
|---|---|---|
| 200 | 40 | THE TASTE IS WEAK AT 400 μ! |
| 600 | 60 | |
| 800 | 0 | MINIMAL UNPLEASANT TASTE IN TASTING! |
| TOTAL | 100 | THE OPINION OF Mr./Ms. B IS CONSIDERED. |

60

COARSE ⇒ FINE

START GRINDING (B)

GRIND INFORMATION RECEIVED!
GEISHA FOR FRENCH PRESS                                    THE AMOUNT OF BEANS[g]

| PARTICLE SIZE [μm] | RATIO [%] | MEMO |
|---|---|---|
| 200 | 45 | THE TASTE IS WEAK AT 400 μ! |
| 600 | 55 | LOW HUMIDITY TO RATIO INCREASE |
| 800 | 0 | MINIMAL UNPLEASANT TASTE IN TASTING! |
| TOTAL | 100 | THE OPINION OF Mr./Ms. B IS CONSIDERED. |

60

COARSE ⇒ FINE

START GRINDING

[Figure 14]
| PARTICLE SIZE [μm] | RATIO [%] |
|---|---|
| 200 | 45 |
| 600 | 55 |
(A)
| GAP [μm] | TIME [SECONDS] |
|---|---|
| 50 | 0.3 |
| 100 | 0.9 |
| 150 | 2.4 |
| 200 | 7.5 |
| 250 | 2.7 |
| 300 | 0.9 |
| 350 | 0.3 |
| 400 | 0.0 |
| 450 | 0.3 |
| 500 | 0.9 |
| 550 | 2.4 |
| 600 | 9.3 |
| 650 | 1.8 |
| 700 | 0.3 |
| 750 | 0.0 |
| 800 | 0.0 |
| 850 | 0.0 |
| 900 | 0.0 |
| 950 | 0.0 |
| 1000 | 0.0 |
(B)
| GAP [μm] | TIME [SECONDS] |
|---|---|
| 50 | 0.0 |
| 100 | 0.0 |
| 150 | 0.0 |
| 200 | 13.5 |
| 250 | 0.0 |
| 300 | 0.0 |
| 350 | 0.0 |
| 400 | 0.0 |
| 450 | 0.0 |
| 500 | 0.0 |
| 550 | 0.0 |
| 600 | 16.5 |
| 650 | 0.0 |
| 700 | 0.0 |
| 750 | 0.0 |
| 800 | 0.0 |
| 850 | 0.0 |
| 900 | 0.0 |
| 950 | 0.0 |
| 1000 | 0.0 |
(C)
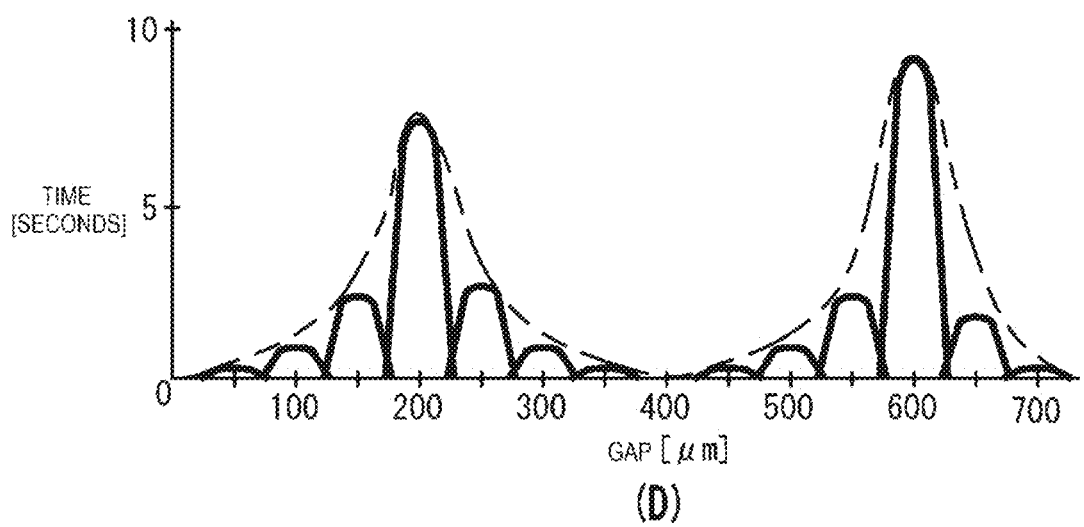
(D)

[Figure 15]
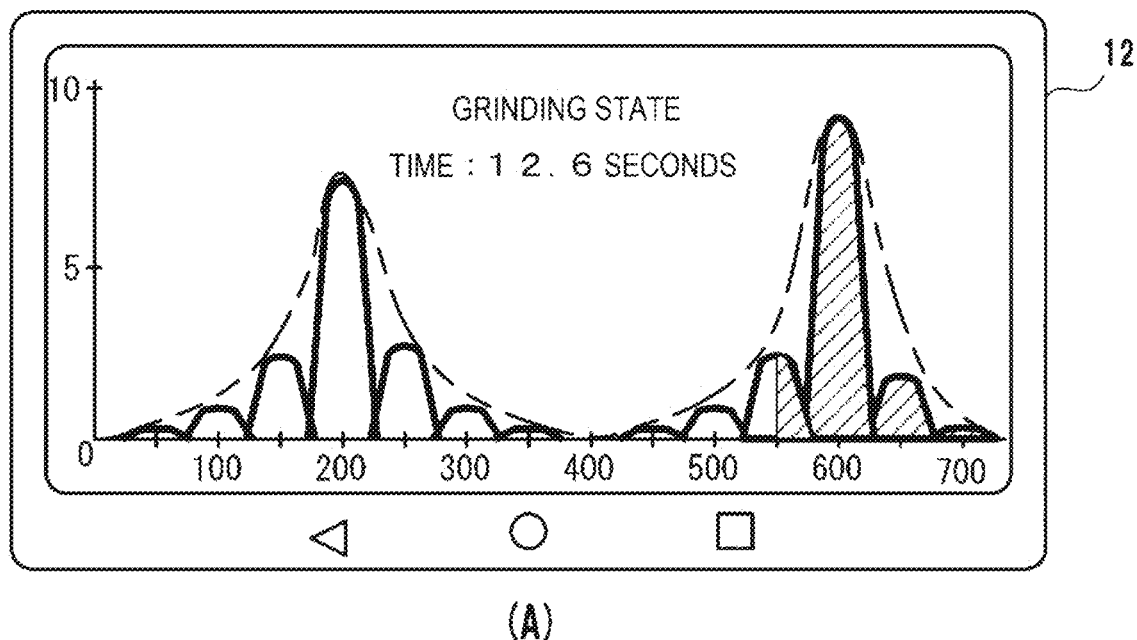
(A)
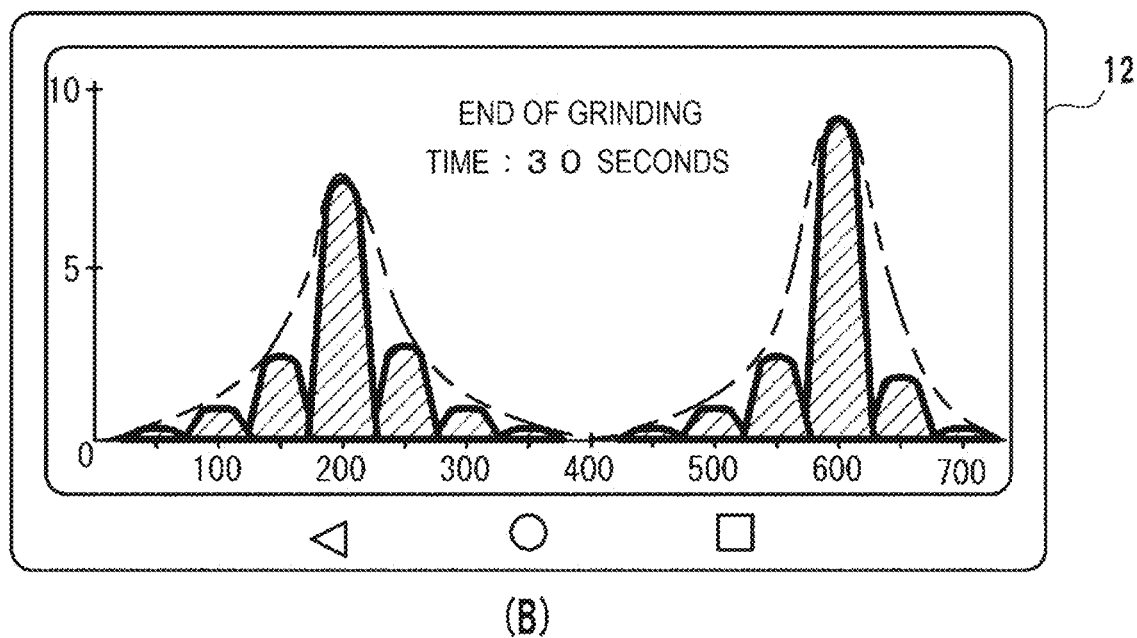
(B)

COFFEE BEAN GRINDING MACHINE

TECHNICAL FIELD

The present invention relates to a coffee bean grinding machine.

BACKGROUND ART

A coffee beverage production device that produces coffee beverages has been proposed (for example, Patent Literature 1).

CITATION LIST

Patent Literature

Patent Literature 1: Japanese Patent Laid-Open No. 2019-30433

SUMMARY OF INVENTION

Technical Problem

However, a coffee beverage production device in the prior art has room for improvement in a configuration for grinding coffee beans.

An object of the present invention is to provide a coffee bean grinding machine that allows a user to enjoy a taste of coffee more.

Solution to Problem

A coffee bean grinding machine for solving the above problem is a coffee bean grinding machine including:
 a grinder configured to grind coffee beans; and
 a control device configured to control the grinder, in which
 the grinder has a plurality of types of particle sizes that can be set for producing ground coffee beans, and
 the control device performs control to produce the ground coffee beans while changing the set particle size of the grinder according to the plurality of set particle sizes.

This coffee bean grinding machine can provide a new taste of ground coffee beans.

In the above coffee bean grinding machine, the control device may be configured to set the plurality of particle sizes based on order information from a user.

In this coffee bean grinding machine, it is possible to provide ground coffee beans that suit the taste of customers.

The coffee bean grinding machine may include a receiving device configured to receive the order information via a network.

This coffee bean grinding machine can enhance convenience of ordering.

In the above coffee bean grinding machine, the control device may have a plurality of types of patterns of the plurality of particle sizes that can be set for one piece of the order information.

In this coffee bean grinding machine, it is possible to provide ground coffee beans with various flavors.

In the above coffee bean grinding machine, the control device may be configured to, when the plurality of particle sizes including a first particle size and a second particle size are set, set which of the first particle size and the second particle size is first ground to by the grinder.

In this coffee bean grinding machine, it is possible to provide ground coffee beans with various flavors.

In the above coffee bean grinding machine, the control device may set the particle size of the grinder according to the one set particle size and control the production of the ground coffee beans.

In this coffee bean grinding machine, it is possible to provide ground coffee beans with various flavors.

There may be a coffee bean grinding system including an external device configured to communicate with the coffee bean grinding machine.

Advantageous Effects of Invention

According to the present invention, a coffee bean grinding machine that allows a user to enjoy a taste of coffee more can be provided.

BRIEF DESCRIPTION OF DRAWINGS

FIG. 1 is a perspective view of a coffee bean grinding machine.
FIG. 2 is a longitudinal cross-sectional view of a pulverizing device.
FIG. 3 is a partially cutaway perspective view of a separation device.
FIG. 4 is a longitudinal cross-sectional view of a forming unit.
FIG. 5 is a perspective view and a partially enlarged view of the forming unit of FIG. 4.
FIG. 6 is a diagram comparatively illustrating cross-sectional areas.
FIG. 7 is a diagram illustrating another example.
FIG. 8 is a block diagram of a control device of a coffee bean grinding machine in FIG. 1.
FIG. 9 is a flowchart showing an example of control executed by the control device.
FIG. 10 is a diagram showing a state when order information is input.
FIG. 11 is a diagram showing a state when the order information is input.
FIG. 12 is a diagram showing a state when the order information is input.
FIG. 13 is a diagram showing a state when the order information is changed.
FIG. 14 is a diagram showing an example of control parameters of a grinder 5B for an order.
FIG. 15 is a diagram showing an example of display during execution of a grinding process.

DESCRIPTION OF EMBODIMENTS

An embodiment according to the present invention will be described with reference to the drawings.

1. Coffee Bean Grinding Machine

A coffee bean grinding machine 1 will be described with reference to FIG. 1. FIG. 1 is a perspective view of the coffee bean grinding machine 1. The coffee bean grinding machine 1 includes a reservoir device 4, a grinding device 5, and a control device 11 (not shown in FIG. 1) for controlling the reservoir device and the pulverizing device. As shown in FIG. 1, a hopper 40 of the reservoir device 4 is provided with an information display device 12. The information display device 12 is a touch panel type display connected to the control device 11 and used to perform various controls of the coffee bean grinding machine 1, and is capable of displaying various types of information and receiving inputs from administrators and beverage consumers.

1-1. Reservoir Device

The reservoir device 4 includes the hopper 40 in which roasted coffee beans are accommodated. Although one hopper 40 is provided in the present embodiment, a configuration in which a plurality of hoppers 40 are provided may be employed. When the plurality of hoppers 40 are provided, roasted coffee beans of different types and degrees of roasting may be accommodated separately. The hopper 40 is provided with a delivery mechanism (not shown) that delivers the roasted coffee beans to a downstream side, and the roasted coffee beans are supplied to the pulverizing device 5 by this delivery mechanism.

1-2. Pulverizing Device

The pulverizing device 5 will be described with reference to FIGS. 1 and 2. FIG. 2 is a longitudinal cross-sectional view of the pulverizing device 5. The pulverizing device 5 includes grinders 5A and 5B, and a separation device 6. The grinders 5A and 5B are mechanisms for grinding roasted coffee beans supplied from the reservoir device 4. The grinder 5A is a grinder for crushing coffee beans into a predetermined size (for example, about ¼) to facilitate separation of wastes adhering to the coffee beans. The grinder 5B is a grinder for grinding the coffee beans crushed by the grinder 5A into ground coffee beans having a desired particle size. Therefore, the grinders 5A and 5B have different particle sizes for grinding beans, and the grinder 5B is a grinder having a finer particle size than the grinder 5A. The particle size of the ground beans in the grinder 5B may have an error (about ±5 µm), but can be adjusted by adjusting an interval between a rotary blade 58b and a fixed blade 57b.

1-2-1. Grinder

The grinder 5A includes a motor 52a and a main body portion 53a. The motor 52a is a drive source of the grinder 5A. The main body portion 53a is a unit for accommodating a cutter, and includes a built-in rotation shaft 54a. A gear 55a is provided on the rotation shaft 54a, and a driving force of the motor 52a is transmitted to the rotation shaft 54a via the gear 55a.

A rotary blade 58a, which is a cutter, is provided on the rotation shaft 54a. A fixed blade 57a, which is a cutter, is provided around the rotary blade 58a. The inside of the main body portion 53a communicates with an inlet 50a and a discharge port 51a. Roasted coffee beans supplied from the reservoir device 4 enter the main body portion 53a from the inlet 50a formed in a side portion of the main body portion 53a, and are pulverized while being sandwiched between the rotary blade 58a and the fixed blade 57a. A preventing plate 56a is provided on an upper side of the rotary blade 58a of the rotation shaft 54a, and the preventing plate 56a prevents the roasted coffee beans from escaping to the upper side. In the grinder 5A, the roasted coffee beans are pulverized to, for example, about ¼. The pulverized ground beans are discharged from the discharge port 51a to the separation device 6.

Roasted coffee beans supplied to the inlet 50a may be supplied not from above the rotary blade 58a but at a height at which the roasted coffee beans come into contact with a side surface of the rotary blade 58a. In this case, since the roasted coffee beans are prevented from escaping to the upper side by the rotary blade 58a, the preventing plate 56a may not be provided.

The grinder 5A may change a size of roasted coffee beans to be discharged after being pulverized by changing the number of rotations of the rotary blade 58a. A distance between the rotary blade 58a and the fixed blade 57a may be manually adjusted to change the size of the roasted coffee beans to be discharged.

The separation device 6 is a mechanism for separating wastes from ground beans. The separation device 6 is disposed between the grinder 5A and the grinder 5B. That is, in the present embodiment, the roasted coffee beans supplied from the reservoir device 4 are first coarsely ground by the grinder 5A, and wastes are separated from the coarsely ground beans by the separation device 6. The coarsely ground beans from which the waste is separated are finely ground by the grinder 5B. The waste to be separated by the separation device 6 is typically chaff and fine powder. The waste can deteriorate the taste of coffee beverages. The separation device 6 is a mechanism that separates the waste by air aspiration force, and details thereof will be described later.

The grinder 5B includes a motor 52b and a main body portion 53b. The motor 52b is a drive source of the grinder 5B. The main body portion 53b is a unit for accommodating a cutter, and includes a built-in rotation shaft 54b. A pulley 55b is provided on the rotation shaft 54b, and a driving force of the motor 52b is transmitted to the rotation shaft 54b via a belt 59b and the pulley 55b.

The rotary blade 58b is provided on the rotation shaft 54b, and the fixed blade 57b is provided on an upper side of the rotary blade 58b. The inside of the main body portion 53b communicates with an inlet 50b and a discharge port 51b. Ground beans falling from the separation device 6 enter the main body portion 53b from the inlet 50b, and are further pulverized while being sandwiched between the rotary blade 58b and the fixed blade 57b. The ground beans pulverized into powder are discharged from the discharge port 51b. A particle size of the ground beans in the grinder 5B can be adjusted by adjusting the interval between the rotary blade 58b and the fixed blade 57b.

The roasted coffee beans may be pulverized by one grinder (one-stage pulverizing). However, as in the present embodiment, performing two-stage pulverizing by the two grinders 5A and 5B makes it easier for ground beans to have a uniform particle size and makes it possible to have a constant degree of extraction of a coffee liquid. At the time of pulverization of beans, heat may be generated due to friction between a cutter and the beans. By performing two-stage pulverizing, heat generation due to friction during pulverizing can be prevented, and deterioration of ground beans (for example, deterioration of flavor) can be prevented.

Through steps of coarse grinding, separation of wastes, and fine grinding, it is possible to increase a mass difference between the wastes such as chaff and ground beans (necessary part) when the wastes are separated. This makes it possible to improve a separation efficiency of wastes, and to prevent ground beans (necessary part) from being separated as wastes. In addition, since a waste separation process using air aspiration is interposed between the coarse grinding and the fine grinding, heat generation of ground beans can be prevented by air cooling. Thereby, deterioration of ground beans (for example, deterioration of flavor) can be prevented.

1-2-2. Separation Device

Next, the separation device 6 will be described with reference to FIG. 1 to FIG. 3. FIG. 3 is a partially cutaway perspective view of the separation device 6. The separation device 6 includes an aspiration unit 6A and a forming unit 6B. The forming unit 6B is a hollow body that forms a separation chamber SC through which ground beans falling freely from the grinder 5A pass. The aspiration unit 6A is a unit that communicates with the separation chamber SC in a direction (in the present embodiment, a left-right direction) intersecting with a passing direction (in the present embodiment, an upper-lower direction) of the ground beans, and aspirates the air in the separation chamber SC. By aspirating the air in the separation chamber SC, lightweight objects such as chaff and fine powder are aspirated. As a result, the waste can be separated from the ground beans.

The aspiration unit 6A is a mechanism of a centrifugal separation type. The aspiration unit 6A includes an air blowing unit 60A and a collection container 60B. The air blowing unit 60A in the present embodiment is a fan motor, and exhausts the air in the collection container 60B upward.

The collection container 60B includes an upper portion 61 and a lower portion 62 that are separably engaged with each other. The lower portion 62 has a bottomed cylindrical shape with an open upper side, and forms a space for accumulating wastes. The upper portion 61 constitutes a lid portion to be attached to an opening of the lower portion 62. The upper portion 61 includes a cylindrical outer circumferential wall 61a and an exhaust pipe 61b formed coaxially with the outer circumferential wall 61a. The air blowing unit 60A is fixed to the upper portion 61 above the exhaust pipe 61b so as to aspirate the air in the exhaust pipe 61b. The upper portion 61 includes a tubular connection portion 61c extending in a radial direction. The connection portion 61c is connected to the forming unit 6B, and allows the separation chamber SC to communicate with the collection container 60B. The connection portion 61c is open to the side of the exhaust pipe 61b.

As the air blowing unit 60A is driven, air flows indicated by arrows d1 to d3 in FIG. 3 are generated. Due to the air flows, the air containing wastes is aspirated into the collection container 60B from the separation chamber SC through the connection portion 61c. Since the connection portion 61c is open to the side of the exhaust pipe 61b, the air containing wastes swirls around the exhaust pipe 61b. A waste D in the air falls by a weight thereof and is collected in a part of the collection container 60B (accumulates on a bottom surface of the lower portion 62). The air is exhausted upward through the inside of the exhaust pipe 61b.

A plurality of fins 61d are integrally formed on a circumferential surface of the exhaust pipe 61b. The plurality of fins 61d are disposed in a circumferential direction of the exhaust pipe 61b. Each of the fins 61d is inclined obliquely with respect to an axial direction of the exhaust pipe 61b. The provision of such fins 61 facilitates the swirling of the air containing the waste D around the exhaust pipe 61b. In addition, the fins 61 facilitate the separation of the waste D. As a result, a length of the aspiration unit 6A in the upper-lower direction can be reduced, which contributes to downsizing of the device.

In the present embodiment, the forming unit 6B is disposed on a falling path of beans ground by the grinders 5A and 5B, and the centrifugal separation type aspiration unit 6A is disposed on the side of the falling path. Although a mechanism of a centrifugal separation type tends to be long in the upper-lower direction, the aspiration unit 6A can be disposed side by side in a lateral direction with respect to the grinder 5A and the grinder 5B by disposing the aspiration unit 6A at the side shifted from the falling path. This contributes to reducing a length of the device in the upper-lower direction. In particular, as in the present embodiment, when two-stage pulverizing is performed by the two grinders 5A and 5B, since the length of the device in the upper-lower direction tends to be long, such disposition of the aspiration unit 6A is effective for downsizing of the device.

The forming unit 6B will be described with reference to FIGS. 1 to 6. FIG. 4 is a longitudinal cross-sectional view of the forming unit 6B. FIG. 5 is a perspective view and a partially enlarged view of the forming unit 6B. FIG. 6 is a plan view of the forming unit 6B, and is an explanatory diagram for comparison of cross-sectional areas.

The forming unit 6B in the present embodiment is formed by combining two members divided into upper and lower halves. The forming unit 6B includes a pipe portion 63 and a separation chamber forming portion 64, and has a spoon shape in a plan view. The pipe portion 63 is a cylindrical body that forms a communication passage 63a with the aspiration unit 6A, and extends in the lateral direction (a direction intersecting a center line CL which will be described later). The separation chamber forming portion 64 is an annular hollow body that is connected to the pipe portion 63, forms the separation chamber SC, and has an opening at the center in the upper-lower direction.

In the present embodiment, when separating wastes from ground beans, a method is adopted in which wastes are aspirated by applying a lateral wind pressure to ground beans falling from the grinder 5A. This is advantageous in that a length in a vertical direction can be shorter than in a centrifugal separation method.

The separation chamber forming portion 64 includes a cylindrical portion 65 extending in the upper-lower direction. The cylindrical portion 65 protrudes into the separation chamber SC from a central portion in the upper-lower direction to a lower portion thereof. The cylindrical portion 65 includes an opening portion 65a at one end on an upper side, and the opening portion 65a forms an inlet of ground beans communicating with the separation chamber SC. The opening portion 65a is positioned outside the separation chamber SC and is connected to the discharge port 51a of the grinder 5A. As a result, ground beans falling from the discharge port 51a are introduced into the separation chamber forming portion 64 without leaking. The cylindrical portion 65 includes an opening portion 65b at the other end on a lower side. The opening portion 65b is positioned in the separation chamber SC. Since the opening portion 65b faces the separation chamber SC, ground beans falling from the discharge port 51a are introduced into the separation chamber SC without leaking.

The cylindrical portion 65 in the present embodiment has a cylindrical shape, and the opening portion 65a and the opening portion 65b have a concentric circular shape positioned on the center line CL. As a result, the ground beans falling from the discharge port 51a easily pass through the cylindrical portion 65. The cylindrical portion 65 has a tapered shape in which a cross-sectional area of an internal space gradually decreases from the opening portion 65a side toward the opening portion 65b side. Since an inner wall of the cylindrical portion 65 has a mortar shape, the falling ground beans easily collide with the inner wall. In some cases, the ground beans falling from the grinder 5A adhere to each other and fall as a lump. When the ground beans are in the form of a lump, the separation efficiency of wastes may decrease. In the present embodiment, the lump of ground beans collides with the inner wall of the cylindrical portion 65, thereby breaking the lump and making it easier to separate wastes.

The inner wall of the cylindrical portion 65 is not limited to a mortar shape in terms of breaking the lump of ground beans. When there is a portion in which a cross-sectional area of an internal space is smaller than that of the opening portion 65*a* in a middle portion of the cylindrical portion 65 and thus the inner wall is inclined (not horizontal) with respect to the center line CL, it is possible to make the ground beans fall smoothly while facilitating collision with the lump. The cylindrical portion 65 does not have to protrude into the separation chamber SC, and may include only a portion protruding upward from an outer surface of the separation chamber forming portion 64. However, since the cylindrical portion 65 protrudes into the separation chamber SC, a wind speed around the cylindrical portion 65 can be improved. Therefore, in a region R1 relatively far from the pipe portion 63, an effect of separating wastes due to the wind pressure can be enhanced.

The separation chamber forming portion 64 includes a discharge port 66 communicating with the separation chamber SC, from which the ground beans are discharged after wastes are separated. The discharge port 66 in the present embodiment is positioned below the opening portion 65*b*, and the ground beans having passed through the cylindrical portion 65 pass through the separation chamber SC and fall freely from the discharge port 66. In the present embodiment, the discharge port 66 is a circular opening positioned on the center line CL, and is an opening concentric with the opening portion 65*a* and the opening portion 65*b*. Therefore, the ground beans easily pass through the separation chamber forming portion 64 by free fall, and it is possible to prevent the ground beans from accumulating in the separation chamber forming portion 64.

As shown in FIG. 6, in the present embodiment, a cross-sectional area SC2 of the discharge port 66 is larger than a cross-sectional area SC1 of the opening portion 65*b*. In the present embodiment, the opening portion 65*b* and the discharge port 66 overlap each other when viewed in the upper-lower direction. Therefore, when the opening portion 65*b* is projected in the upper-lower direction with respect to the discharge port 66, the opening portion 65*b* is accommodated inside the discharge port 66. In other words, the opening portion 65*b* is accommodated in a region in which the discharge port 66 is extended in the upper-lower direction. It is also possible to adopt a configuration in which the opening portion 65*b* and the discharge port 66 are not on the same center line but overlap each other, or a configuration in which at least one of the opening portion 65*b* and the discharge port 66 is not circular but is overlapped.

A ratio of the cross-sectional area SC1 to the cross-sectional area SC2 is, for example, 95% or less, or 85% or less, and is, for example, 60% or more or 70% or more. Since the opening portion 65*b* and the discharge port 66 are concentric, the opening portion 65*b* and the discharge port 66 overlap each other when viewed in the direction of the center line CL. Therefore, ground beans falling freely from the opening portion 65*b* are easily discharged from the discharge port 66. In addition, it is possible to prevent the falling ground beans from colliding with an edge of the discharge port 66 and jumping to the pipe portion 63 side, and it is also possible to prevent the required ground beans from being aspirated to the aspiration unit 6A. Although it has been exemplified that an opening area of the opening portion on one end (for example, 65*a*) is smaller than an opening area of the discharge port (for example, 66), the opening area of the discharge port (for example, 66) and the opening area of the opening portion on one end (for example, 65*a*) may be the same, or the opening area of the opening portion on one end (for example, 65*a*) may be larger than the opening area of the discharge port (for example, 66). Although it has been exemplified that an opening area of the opening portion on the other end (for example, 65*b*) is smaller than the opening area of the discharge port (for example, 66), the opening area of the discharge port (for example, 66) and the opening area of the opening portion on the other end (for example, 65*b*) may be the same, or the opening area of the opening portion on the other end (for example, 65*b*) may be larger than the opening area of the discharge port (for example, 66).

Although it has been exemplified that the air is aspirated from the discharge port 66 and the inlets (for example, 65*a* and 65*a*') by the aspiration unit (for example, 6A), an amount of air aspirated from the discharge port 66 may be larger than an amount of air aspirated from the inlets (for example, 65*a* and 65*a*'). This may be implemented by the opening portion on the other end (for example, 65*b*) protruding into the separation chamber, a size of the cross-sectional area of the discharge port 66 being larger than a size of the opening area of the opening portion on one end (for example, 65*a*), the size of the cross-sectional area of the discharge port 66 being larger than a size of the opening area of the opening portion on the other end (for example, 65*b*), a distance from the discharge port 66 to the separation chamber being shorter than a distance from the opening portion on one end (for example, 65*a*) to the separation chamber, a distance from the discharge port 66 to the exhaust pipe 61*b* being shorter than a distance from the opening portion on one end (for example, 65*a*) to the exhaust pipe 61*b*, or a distance from the discharge port 66 to the air blowing unit 60A being shorter than a distance from the opening portion on one end (for example, 65*a*) to the air blowing unit 60A. Any one of inner wall portions of members (63 to 65) constituting the forming unit 6B and the separation chamber SC, the cylindrical portion 65, or the opening portion on the other end (for example, 65*b*) may vibrate by being in contact with the grinder (at least one of 5A or 5B) directly or indirectly via another member to receive the vibration due to rotation of the grinder. For example, in the case of the coffee bean grinding machine 1 in the embodiment, since they are in direct or indirect contact, during the operation of the grinder, any one of the inner wall portions of the members (63 to 65) constituting the forming unit 6B and the separation chamber SC, the cylindrical portion 65, or the opening portion on the other end (for example, 65*b*) vibrates, and by the turbulent air generated in the separation chamber SC due to the vibration, a brake is applied to light wastes entering the separation chamber SC from the opening portion on the other end (for example, 65*b*) to facilitate the aspiration of the wastes by the aspiration unit (for example, 6A). In particular, the forming unit 6B, like the coffee bean grinding machine 1 in the embodiment, is in direct contact with the grinder 5A out of the grinder 5A and the grinder 5B, and by bringing the forming unit 6B into direct contact with one grinder in this way, appropriate vibration may be applied to the forming unit 6B to facilitate the aspiration of light wastes.

In the present embodiment, the air aspirated by the aspiration unit 6A is mainly aspirated through the discharge port 66. Therefore, a gap is provided between the discharge port 66 and the inlet 50*b* of the grinder 5B, and air aspiration is facilitated. An arrow d4 schematically indicates a direction of an air flow of the air aspirated by the aspiration unit 6A. Aspiration of air from the discharge port 66 makes it difficult for wastes to be discharged from the discharge port 66, and separation performance between ground beans and wastes can be improved. The air aspirated by the aspiration unit 6A is also aspirated through the opening portion 65a.

A turbulent flow generating portion 67 is formed in a surrounding wall defining the discharge port 66. The turbulent flow generating portion 67 generates a turbulent flow in the air aspirated from the discharge port 66 into the separation chamber SC. By forming the turbulent flow generating portion 67, a turbulent flow is particularly likely to occur in a region R2 between the opening portion 65b and the discharge port 66. In the present embodiment, since the wind speed is increased around the cylindrical portion 65, the generation of the turbulent flow in the region R2 can be synergistically facilitated.

Ground beans put into the inlet 65a are stirred by being affected by the turbulent flow when passing through the region R2. In the present embodiment, in particular, as described above, since the cross-sectional area SC2 of the discharge port 66 is larger than the cross-sectional area SC1 of the opening portion 65b, the ground beans always pass through the region R2. Due to the turbulent flow, wastes such as chaff and fine powder are easily separated from the ground beans. Therefore, even if the separation chamber SC is a small space, it is possible to improve the separation efficiency of the wastes, and in particular, it contributes to reducing a length of the separation chamber SC in the upper-lower direction, which is advantageous in reducing the size of the device when two-stage pulverizing is performed by the two grinders 5A and 5B as in the present embodiment.

In the present embodiment, the turbulent flow generating portion 67 includes a plurality of turbulent flow generating elements 67a. The turbulent flow generating element 67a is a protrusion protruding downward in the upper-lower direction. A direction in which the turbulent flow generating element 67a protrudes may be any direction, but a direction within a range from a lower direction to a radially inward direction is preferable in terms of facilitating the generation of a turbulent flow in the separation chamber SC. In the present embodiment, when the protruding direction is the lower direction, the falling ground beans are not caught, which is more preferable.

A cross-sectional shape of the turbulent flow generating element 67a is such that an upper base of a cross section of a quadrangular prism having a trapezoidal shape is oriented in the direction of the center line CL, and an inner side of a tip end portion is provided with a chamfer 67b. The shape of the turbulent flow generating element 67a is not limited to the shape in the present embodiment, but a shape that makes a shape of the discharge port 66 three-dimensionally complicated is preferable.

In the present embodiment, the turbulent flow generating element 67a is repeatedly formed in a circumferential direction d5 of the discharge port 66. As a result, air is blown into the region R from multiple directions, which facilitates the generation of a turbulent flow. The adjacent turbulent flow generating elements 67a may have different pitches, but have the same pitch in the present embodiment. Although twelve turbulent flow generating elements 67a are formed, the number of the turbulent flow generating elements 67a is any number.

1-2-3. Another Configuration Example

Another configuration example of the separation chamber forming portion 64 will be described with reference to FIG. 7. The turbulent flow generating elements 67a may be projections, notches, or holes. An example EX1 in FIG. 7 illustrates an example in which the turbulent flow generating elements 67a are through holes formed in a peripheral wall of the discharge port 66. Such holes can also promote generation of turbulent flow in the region R2.

An example EX2 in FIG. 7 shows an example in which the cylindrical portion 65 is not provided. In this case as well, a configuration in which the cross-sectional area SC2 of the discharge port 66 is larger than a cross-sectional area SC1' of an inlet 65a' is preferable.

The opening portion 65b of the cylindrical portion 65 may be an opening on an inclined surface instead of an opening on a horizontal surface. In an example EX3 in FIG. 7, a lower end of the cylindrical portion 65 on a pipe portion 63 side protrudes downward from the lower end on an opposite side. Accordingly, the ground beans can be easily guided to a region R1 side, and a residence time of the ground beans in the separation chamber SC can be increased, and the separation effect can be enhanced.

2. Control Device

The control device 11 of the coffee bean grinding machine 1 will be described with reference to FIG. 8. FIG. 8 is a block diagram of the control device 11.

The control device 11 controls the entire coffee bean grinding machine 1. The control device 11 includes a processing unit 11a, a storage unit 11b, and an interface (I/F) unit 11c. The processing unit 11a is, for example, a processor such as a CPU. The storage unit 11b is, for example, a RAM or a ROM. The I/F unit 11c includes an input and output interface that inputs and outputs a signal between an external device and the processing unit 11a. The I/F unit 11c also includes a communication interface capable of performing data communication with a server 16 and a mobile terminal 17 via a communication network 15 such as the Internet. The server 16 can communicate with the mobile terminal 17 such as a smartphone via the communication network 15, and can receive, for example, information such as a reservation for production of ground beans of coffee and an impression from the mobile terminal 17 of a consumer. A system for grinding coffee beans includes the coffee bean grinding machine 1, the server 16, and the mobile terminal 17.

The processing unit 11a executes a program stored in the storage unit 11b, and controls an actuator group 14 based on an instruction from the information display device 12, a detection result of a sensor group 13, or an instruction from the server 16. The sensor group 13 includes various sensors (for example, an operation position detection sensor of a mechanism) provided in the coffee bean grinding machine 1. The actuator group 14 includes various actuators (for example, a motor) provided in the coffee bean grinding machine 1.

3. Operation Control Example

A control process example of the coffee bean grinding machine 1 which is executed by the processing unit 11a will be described with reference to FIG. 9. FIG. 9 shows a control process example for producing ground coffee beans. This process is an example of executing a grinding process according to order information from the outside (for example, the server 16 and the mobile terminal 17) of the ground coffee bean machine 1.

In step S1, it is determined whether the order information for the ground coffee beans is received. If the order information is not received, step S1 is repeatedly executed. If the order information is received, the process proceeds to step S2. Specific contents of the order information will be described later.

In step S2, the received order information is displayed on the information display device 12, and the process proceeds to step S3.

In step S3, it is determined whether a grinding start operation of coffee beans is received. If the grinding start operation is not received, the process proceeds to step S4, and if the grinding start operation is received, the process proceeds to step S6.

In step S4, it is determined whether an order information change operation is received. If the order information change operation is received, the process proceeds to step S5, and if the order information change operation is not received, the process returns to step S3.

In step S5, the received order information is updated according to the order information change operation, and the process returns to step S3.

During the period from the reception of the order information to the reception of the grinding start operation, the received order information can be changed in steps S4 and S5. The grinding start operation and the order information change operation are not limited to the operation of the information display device 12, an operation from the mobile terminal 17 may be received, and as long as the information of this operation is transmitted to the coffee bean grinding machine 1, a transmission path thereof may be any path.

In step S6, a grinding process of coffee beans is executed. First, an amount of roasted coffee beans specified by the order information is supplied from the reservoir device 4 to the grinder 5A. In the grinder 5A, the ground coffee beans are supplied to the grinder 5B after wastes are separated by the separation device 6. In the grinder 5B, coffee beans are ground while the interval between the fixed blade 57b and the rotary blade 58b is changed at a predetermined interval (for example, every 50 µm) according to the order information, and the ground coffee beans are discharged from the discharge port 51b. When the grinding process ends, a process of producing ground coffee beans ends.

In the above example, although a case where the grinding process is executed according to the order information from the outside of the ground coffee bean machine 1 has been described, the order information may be directly input to the ground coffee bean machine 1 using the information display device 12. In the case of this configuration, step S2, step S4, and step S5 shown in FIG. 9 may be omitted.

In the above example, although the order information can be changed during the period from the reception of the order information to the reception of the grinding start operation, the grinding process may be started as soon as the order information is received without providing an opportunity for such changes.

4. Order and Operation Example

Hereinafter, while referring to the flow of the control process described with reference to FIG. 9, an example of an operation for the order information will be described with reference to FIG. 10 to FIG. 15. FIG. 10 to FIG. 12 are diagrams showing a state when the order information is input. FIG. 13 is a diagram showing a state when the order information is changed. FIG. 14 is a diagram showing an example of control parameters of the grinder 5B for an order. FIG. 15 is a diagram showing an example of display during execution of a grinding process.

In this example, it is assumed that an application for transmitting order information on ground beans of coffee is installed in the mobile terminal 17. FIG. 10 shows an example of an order information input screen using this application. On this input screen, there are displayed an order title input field 171, an input table 172 for specifying a ratio with respect to a particle size at the time of grinding coffee beans, a fine grinding to coarse grinding button 173a for indicating a grinding way from a fine grinding state to a coarse grinding state, a coarse grinding to fine grinding button 173b for indicating a grinding way from a coarse grinding state to a fine grinding state, a graph area 174 for displaying contents input to the input table 172 in a graph, and a send button 175 for sending order information.

FIG. 11 is a diagram showing an example of an input screen in a state in which order information is input. On this input screen, a character "Geisha For French press" is input in the title input field 171. In the input table 172, "40" indicating a ratio of a particle size of 200 µm and "60" indicating a ratio of a particle size of 800 µm are input, and it is shown that a total ratio is "100" %. It is shown that memos corresponding to the particle size of 200 µm, the particle size of 800 µm, and the total are input. In addition, the coarse grinding to fine grinding button 173b is selected. In the graph area 174, the content input to the input table 172 is displayed as a graph. Two peaks are shown in this graph, where a left peak indicates that the ratio of the particle size of 200 µm is 40%, and a right peak indicates that the ratio of the particle size of 800 µm is 60%.

In the graph area 174, the content input to the input table 172 can be indirectly changed by dragging a part of the graph. FIG. 12 shows an example in which the right peak of the two peaks in the graph area 174 shown in FIG. 11 is moved to the left. This operation indicates that "60" indicating the ratio of the particle size of 800 µm input to the input table 172 is changed to "0" and "0" indicating a ratio of a particle size of 600 µm is changed to "60". Such an input method by dragging the graph is not limited to changing the particle size, and may also change the ratio. For example, the ratio of the corresponding particle size may be increased or decreased by vertically dragging a part of the graph.

In the example shown in FIG. 12, after a value is input to the input table 172, the value input to the input table 172 is changed by dragging a part of the graph. Without being limited to this configuration, a graph (a flat straight line, shown by a thick line in FIG. 10) of an initial state may be displayed in the graph area 174 from a state (initial state) before a value is input to the input table 172, and the value in the input table 172 may be set by dragging the graph.

By the input method using the graph as described above, a user can set the ratio of the particle size more intuitively.

In addition, when the magnitude of one peak is increased, the magnitude of another peak may be relatively decreased, for example, by increasing or decreasing the magnitude of one peak, the magnitude of another peak may be relatively increased or decreased. If a size of the graph area 174 is limited, the graph area 174 can be more effectively used.

After the title, the ratio of particle size, the grinding way, and the amount of coffee beans (not shown in FIG. 10 to FIG. 12) are set, by tapping the send button 175, the order information is transmitted to the control device 11 of the coffee bean grinding machine 1 via the communication network 15. After being transmitted to the server 16 once, the order information may be transmitted via the server 16 and the communication network 15.

When the order information is received, the content of the received order information is displayed on the information display device 12 (Yes in step S1 and step S2 of FIG. 9). (A) of FIG. 13 shows an example in which the control device 11 receives the order information transmitted with the content shown in FIG. 12, and the content is displayed on the information display device 12. Specifically, the title input in the title input field 171 of FIG. 12 and the content of the input table 172 excluding a row of a particle size in which the ratio is 0 and a memo field is blank (rows of particle sizes of 400 μm and 1000 μm in FIG. 12) are displayed in a reception table 121. Further, in a grinding way indication field 122, it is shown that a grinding way from a fine grinding state to a coarse grinding state is indicated by selecting the coarse grinding to fine grinding button 173b in FIG. 12. The received amount of beans (60 g in this example) is shown in a bean amount field 123. The amount of beans may be set separately at a store.

When a grinding start button 124 is tapped in this state, a grinding process of coffee beans is executed (details will be described later), and in a state before the grinding start button 124 is tapped, the order information can be changed (No in step S3, Yes in step S4, and step S5 in FIG. 9). When the order information is changed, the grinding process of coffee beans is executed according to this information. Depending on a temperature and humidity at the time of grinding, the particle size of ground coffee beans may be small (or large), and the order information can be changed and adjusted at a store.

For example, although the order information of (A) of FIG. 13 is received, since the humidity is low, it is assumed that the particle size of ground coffee beans is fine. At this time, for example, as shown in (B) of FIG. 13, in the reception table 121, "40" indicating the ratio of the particle size of 200 μm is changed to "45", and "60" indicating the ratio of the particle size of 600 μm is changed to "55", so that the particle size of ground coffee beans can be adjusted to a preferable large particle size. In the example of (B) of FIG. 13, a description of "low humidity to ratio increase" is added to the memo field, and with such a memo, for example, information such as a correction reason can be transmitted.

Next, an operation after the grinding start button 124 is tapped will be described by taking a case where the grinding start button 124 is tapped in a state shown in (B) of FIG. 13 as an example. When the grinding start button 124 is tapped, a grinding process of coffee beans is executed according to the order information (Yes in step S3 and step S6 in FIG. 9). (A) of FIG. 14 shows the particle sizes and the ratios specified in (B) of FIG. 13.

In this grinding process, control is performed to grind coffee beans while changing the interval between the blades (the interval between the fixed blade 57b and the rotary blade 58b) of the grinder 5B at a predetermined interval (for example, every 50 μm) such that a particle size distribution of ground coffee beans to be produced spreads to a range (in the present embodiment, a range of ±100 μm to 150 μm) with respect to the particle size of the ground coffee beans specified by the order information. For example, (B) of FIG. 14 shows that an operation time for operating the grinder 5B while changing the interval between the blades of the grinder 5B within a range of 50 μm to 350 μm is set with respect to the specification of the particle size of 200 μm specified in (A) of FIG. 14. (B) of FIG. 14 shows that an operation time for operating the grinder 5B while changing the interval between the blades of the grinder 5B within a range of 450 μm to 700 μm is set with respect to the specification of the particle size of 600 μm specified in (A) of FIG. 14. (D) of FIG. 14 is a graph showing a length of the operation time for each interval between the blades of the grinder 5B shown in (B) of FIG. 14. Since the interval between the blades of the grinder 5B and the operation time thereof set here are correspond to the particle size distribution of the ground coffee beans to be produced, it can be said that the particle size distribution is set.

In the above example, it is assumed that it takes 30 seconds in total to produce 60 g of ground coffee beans specified by the order information. Then, 45% (13.5 seconds) of the operation time is assigned to an operation for the particle size of 200 μm. In the above example, since the grinder 5B is operated while the interval between the blades of the grinder 5B is changed in the range of 50 μm to 350 μm with respect to the specification of the particle size of 200 μm, the operation time of 13.5 seconds is assigned to the operation of the grinder in this range. In (B) of FIG. 14, the total operation time of the grinder in the interval range of 50 μm to 350 μm is 13.5 seconds. In addition, 55% (16.5 seconds) of the operation time of 30 seconds in total is assigned to an operation for the particle size of 600 μm. In the above example, since the grinder 5B is operated while the interval between the blades of the grinder 5B is changed in the range of 450 μm to 700 μm with respect to the specification of the particle size of 600 μm, the operation time of 16.5 seconds is assigned to the operation of the grinder in this range. In (B) of FIG. 14, the total operation time of the grinder in the interval range of 450 μm to 700 μm is 16.5 seconds. As described above, the operation time shown in (B) of FIG. 14 is derived from the time required for the production of ground coffee beans. In (B) of FIG. 14, an example has been described in which the ranges of the interval between the blades of the grinder 5B with respect to the specification of the two types of particle size do not overlap, and when these ranges overlap each other, the operation time for the overlapping part is added.

As described in the example of (B) of FIG. 14, by producing ground coffee beans while changing the interval between the blades of the grinder 5B, the particle size of the ground coffee beans can be dispersed. Coffee extracted from the ground coffee beans having a dispersed particle size can have various tastes as compared with coffee extracted from ground coffee beans having no dispersed particle size. For example, an operation time as shown in (C) of FIG. 14 may be set for a person who does not like such tastes. In (C) of FIG. 14, the operation time of the grinder 5B is set only for an operation at an interval of the blades having the same value as the particle size specified by the order information, and corresponds to a particle size distribution in which the particle size dispersion is prevented. These configurations are merely examples, and the range of the particle size distribution may be specified when the particle size is specified.

In the example of (B) of FIG. 14, although the operation time at the interval of the blades having the same value as the particle size specified by the order information is the longest, and the operation time is shorter as a difference between the specified particle size and the interval of the blades of the grinder 5B is larger, for example, the operation times may be set to the same value for the operation of the grinder 5B at intervals of the blades of ±50 μm with respect to the specified particle size, or a plurality of patterns of the particle size distribution may be provided so as to be selectable therefrom.

Information of the operation time as shown in (B) of FIG. 14 may be input when the order information is created, and when the information of the operation time is included in the order information, the grinding process may be executed according to the information of the operation time.

Although two types of particle size values are set in (A) of FIG. 14, the number of types of the particle size for which a value is specified may be one instead of a plurality of types. For example, when one type of a particle size value is set, the operation time is set based on this value.

The grinding way in the grinder 5B in the present embodiment includes two types of grinding ways, that is, a grinding way from a fine grinding state to a coarse grinding state and a grinding way from a coarse grinding state to a fine grinding state, and any one of the ways is specified by using the fine grinding to coarse grinding button 173*a* and the coarse grinding to fine grinding button 173*b* described with reference to FIG. 10 to FIG. 12. When the grinding way from a fine grinding state to a coarse grinding state is specified, while the interval between the blades of the grinder 5B is increased from 50 μm to 1000 μm, the grinder 5B is operated for an operation time set for each interval. On the other hand, when the grinding way from a coarse grinding state to a fine grinding state is specified, while the interval between the blades of the grinder 5B is reduced from 1000 μm to 50 μm, the grinder 5B is operated for an operation time set for each interval. Depending on the grinding way, a slight difference may occur in a particle size distribution of ground coffee beans to be produced, which may cause a difference in taste. Therefore, the present embodiment adopts a configuration in which these grinding ways can be set.

In (B) of FIG. 13, since the grinding way from a coarse grinding state to a fine grinding state is specified, while the interval between the blades of the grinder 5B is reduced from 1000 μm to 50 μm, the grinder 5B is operated for an operation time set for each interval. At this time, a graph shown in (D) of FIG. 14 is displayed on the information display device 12, and a color of the graph region changes according to the progress of this operation. (A) of FIG. 15 shows a state when 12.6 seconds have elapsed from the start of grinding. At this time, the interval between the blades of the grinder 5B is set to 550 μm, and in (A) of FIG. 15, it is indicated by hatching that a color of a right side region of the boundary of 550 μm has changed. This hatching is an example indicating that the grinding process of the corresponding region has been completed. (B) of FIG. 15 shows a state in which the grinding process is completed after 30 seconds have elapsed from the start of the grinding. In (B) of FIG. 15, all the regions are hatched as an example indicating that all the grinding processes have been completed. As in the examples of (A) and (B) of FIG. 15, by displaying the progress of the grinding process, efficient work may be possible, such as preventing a customer from getting bored while waiting, or allowing a store clerk to do other work during that time.

In the examples of (A) and (B) of FIG. 15, a display example has been described in which hatching spreads from the right side of the graph in a case where the grinding way from a coarse grinding state to a fine grinding state is specified, but in a case where the grinding way from a fine grinding state to a coarse grinding state is specified, unlike the example of (A) and (B) of FIG. 15, it is displayed that hatching spreads from the left side of the graph.

In the above example, although the configuration in which the progress of the grinding process is displayed on the information display device 12 has been described, the progress of the grinding process may be displayed on the mobile terminal 17 that has transmitted the order information.

5. Another Configuration

In the coffee bean grinding machine 1 described above, the pulverizing device 5 uses the grinder 5A and the grinder 5B to grind the coffee beans in two stages. However, in executing the operations described with reference to FIG. 9 to FIG. 15, the present invention is not limited to such a configuration, and a single grinder may be used, and the grinder mechanism is not limited to the mechanism described above.

As described with reference to FIG. 14, in dispersing the particle size of the ground coffee beans, for example, a configuration may be adopted in which two grinders are provided, one for the particle size range of 50 μm to less than 500 μm and the other for the particle size range of 500 μm to 1000 μm, and the two grinders are used by switching or used simultaneously according to the order information. That is, a configuration in which a plurality of grinders are used by switching may be adopted, or a configuration in which a plurality of grinders are used simultaneously may be adopted. The plurality of grinders are not limited to a configuration in which the ranges of the particle size of ground coffee beans for which the grinders are respectively responsible are different, but may be a configuration in which these ranges are the same.

In the above example, the configuration in which the information display device 12 is used to display the order information of the ground coffee beans and the grinding start operation is performed has been described, but such a role may be implemented by an external device such as the mobile terminal 17 or the server 16. That is, a ground coffee bean system may include the ground coffee bean machine 1 and the server 16 or the mobile terminal 17.

SUMMARY OF EMBODIMENTS

The above embodiment has described a coffee bean grinding machine (for example, the coffee bean grinding machine 1), including:
  a grinder (for example, the grinder 5B) configured to grind coffee beans; and
  a control device (for example, the control device 11) configured to control the grinder, in which
  the control device is configured to control the grinder according to a set particle size distribution (for example, (B) of FIG. 14).
Described is the coffee bean grinding machine, in which
  the control device is configured to set the particle size distribution based on order information from a user (for example, FIG. 9, (A) of FIG. 14, and (B) of FIG. 14).
Described is the coffee bean grinding machine, further including:
  a receiving device (for example, the I/F unit 11*c*) configured to receive the order information via a network.
Described is the coffee bean grinding machine, in which
  the control device has a plurality of types of patterns of the particle size distribution that can be set for one piece of the order information.
Described is the coffee bean grinding machine, in which
  the control device is configured to, when the particle size distribution including a first particle size and a second particle size is set, set which of the first particle size and the second particle size is first ground to by the grinder (for example, the fine grinding to coarse grinding button 173*a* and the coarse grinding to fine grinding button 173*b* in FIG. 11).
Described is the coffee bean grinding machine, in which
  the grinder has a plurality of types of particle sizes that can be set for producing ground coffee beans, and the control device performs control to produce the ground coffee beans while changing the set particle size of the grinder (for example, (B) of FIG. 14).

Described is a coffee bean grinding system, including:
an external device (for example, the server 16, the mobile terminal 17) configured to communicate with the above coffee bean grinding machine.

Described is a coffee bean grinding method (for example, (B) of FIG. 14), including:
a particle size distribution setting step of setting a particle size distribution; and
a coffee bean grinding step of grinding coffee beans according to the set particle size distribution.

Described is the coffee bean grinding method, in which the particle size distribution setting step is a step of setting the particle size distribution based on order information from a user (for example, FIG. 9, (A) of FIG. 14, and (B) of FIG. 14).

Described is the coffee bean grinding method, further including:
an order receiving step of receiving the order information via a network.

Described is the coffee bean grinding method, in which a plurality of types of patterns of the particle size distribution that can be set for one piece of the order information are provided in the particle size distribution setting step.

Described is the coffee bean grinding method, further including:
a grinding way setting step of, when the particle size distribution including a first particle size and a second particle size is set, setting which of the first particle size and the second particle size is first ground to (for example, the fine grinding to coarse grinding button 173a and the coarse grinding to fine grinding button 173b in FIG. 11).

Described is the coffee bean grinding method, in which the coffee bean grinding step is a step of grinding the coffee beans while changing the set particle size of the grinder having a plurality of types of particle sizes that can be set for producing the ground coffee beans (for example, (B) of FIG. 14).

The above embodiment has described a coffee bean grinding machine (for example, the coffee bean grinding machine 1), including:
a grinder (for example, the grinder 5B) configured to grind coffee beans; and
a control device (for example, the control device 11) configured to control the grinder, in which
the grinder has a plurality of types of particle sizes that can be set for producing ground coffee beans, and
the control device controls the production of ground coffee beans while changing the set particle size of the grinder according to the plurality of set particle sizes (for example, (B) of FIG. 14).

Described is the coffee bean grinding machine, in which the control device is configured to set the plurality of particle sizes based on order information from a user (for example, FIG. 9, (A) of FIG. 14, and (B) of FIG. 14).

Described is the coffee bean grinding machine, further including:
a receiving device (for example, the I/F unit 11c) configured to receive the order information via a network.

Described is the coffee bean grinding machine, in which the control device has a plurality of types of patterns of the plurality of particle sizes that can be set for one piece of the order information.

Described is the coffee bean grinding machine, in which the control device is configured to, when the plurality of particle sizes including a first particle size and a second particle size are set, set which of the first particle size and the second particle size is first ground to by the grinder (for example, the fine grinding to coarse grinding button 173a and the coarse grinding to fine grinding button 173b in FIG. 11).

Described is the coffee bean grinding machine, in which the control device sets the particle size of the grinder according to the one set particle size and controls the production of the ground coffee beans.

Described is a coffee bean grinding system, including:
an external device (for example, the server 16, the mobile terminal 17) configured to communicate with the above coffee bean grinding machine.

Described is a coffee bean grinding method, including:
a particle size distribution setting step of setting a particle size distribution; and
a coffee bean grinding step of grinding coffee beans according to the set particle size distribution, in which
the coffee bean grinding step is a step of grinding the coffee beans while changing the set particle size of the grinder having a plurality of types of particle sizes that can be set for producing the ground coffee beans (for example, (B) of FIG. 14).

Described is the coffee bean grinding method, in which the particle size distribution setting step is a step of setting the plurality of particle sizes based on order information from a user (for example, FIG. 9, (A) of FIG. 14, and (B) of FIG. 14).

Described is the coffee bean grinding method, further including:
an order receiving step of receiving the order information via a network.

Described is the coffee bean grinding method, in which a plurality of types of patterns of the plurality of particle sizes that can be set for one piece of the order information are provided in the particle size distribution setting step.

Described is the coffee bean grinding method, further including:
a grinding way setting step of, when the plurality of particle sizes including a first particle size and a second particle size are set, setting which of the first particle size and the second particle size is first ground to (for example, the fine grinding to coarse grinding button 173a and the coarse grinding to fine grinding button 173b in FIG. 11).

Described is the coffee bean grinding method, in which the coffee bean grinding step is a step capable of producing the ground coffee beans by setting the particle size of the grinder according to the one set particle size.

The present invention is not limited to the embodiments described above, and various modifications and variations are possible without departing from the spirit and scope of the present invention.

The invention claimed is:

1. A coffee bean grinding machine, comprising:
a grinder configured to grind coffee beans; and
a control device configured to control the grinder, wherein
the grinder is configured to grind coffee beans at a particle size specified by the control device for producing ground coffee beans, the control device is configured to set a plurality of particle sizes based on order information from a user, the control device performs control to produce the ground coffee beans while sequentially changing the particle size setting of the grinder through the plurality of set particle sizes, and the plurality of particle sizes are set based on the order information, including by selecting one of a plurality of preset patterns, each pattern defining a plurality of particle sizes.

2. The coffee bean grinding machine according to claim 1, further comprising:

a receiving device configured to receive the order information via a network.

3. A coffee bean grinding machine, comprising:

a grinder configured to grind coffee beans; and a control device configured to control the grinder, wherein the grinder is configured to grind coffee beans at a particle size specified by the control device for producing ground coffee beans, the control device performs control to produce the ground coffee beans while sequentially changing the particle size setting of the grinder through a plurality of particle sizes, and the control device is configured to, when the plurality of particle sizes including a first particle size and a second particle size are set, set which of the first particle size and the second particle size the grinder is to use first.

* * * * *